United States Patent
Gorodyansky

(10) Patent No.: US 9,807,100 B2
(45) Date of Patent: Oct. 31, 2017

(54) SYSTEM AND METHOD FOR PRIVATE SOCIAL NETWORKING

(75) Inventor: David Gorodyansky, Mountain View, CA (US)

(73) Assignee: ANCHORFREE, INC., Menlo Park, CA (US)

( * ) Notice: Subject to any disclaimer, the term of this patent is extended or adjusted under 35 U.S.C. 154(b) by 0 days.

(21) Appl. No.: 13/190,286

(22) Filed: Jul. 25, 2011

(65) Prior Publication Data

US 2012/0023332 A1    Jan. 26, 2012

Related U.S. Application Data

(60) Provisional application No. 61/367,304, filed on Jul. 23, 2010.

(51) Int. Cl.
*H04L 9/32* (2006.01)
*H04L 29/06* (2006.01)

(52) U.S. Cl.
CPC ........ *H04L 63/105* (2013.01); *H04L 63/0428* (2013.01); *H04L 63/061* (2013.01)

(58) Field of Classification Search
CPC ............. H04L 12/588; H04L 2463/041; H04L 47/125; H04L 47/147; H04L 12/66
USPC ................................... 713/168; 709/224–230
See application file for complete search history.

(56) References Cited

U.S. PATENT DOCUMENTS

| | | | |
|---|---|---|---|
| 2008/0104679 A1* | 5/2008 | Craig | 726/4 |
| 2009/0276314 A1 | 11/2009 | Gorodyansky et al. | |
| 2010/0011431 A1* | 1/2010 | Cynkin | G06F 21/6218 726/9 |
| 2010/0318571 A1* | 12/2010 | Pearlman | H04L 63/104 707/784 |
| 2011/0046980 A1* | 2/2011 | Metzler | G06F 19/322 705/3 |
| 2011/0145571 A1* | 6/2011 | Schmidt-Karaca | H04L 63/0428 713/160 |

* cited by examiner

*Primary Examiner* — Evans Desrosiers
(74) *Attorney, Agent, or Firm* — TransPacific Law Group; Pavel I. Pogodin, Esq.

(57) ABSTRACT

System protects user's data on social networking websites by creating a data filter, which operates between the user and the social networks accessed by the user. The filter may be deployed as a user's web browser plug-in and operates in the following way. First, the filter encrypts all or some information that is posted by the user on a social network using SSL encryption technology. Second, to enable select other users of the social networking site to view the encrypted information, the instances of the filter executing on the accessing users' computers verify whether these users have access permission from the owner of the content and, if so, use the decryption key to decrypt the private data and enable the users to view it. The decryption key may be automatically passed to the instances of the filter running on the accessing users' computers. In an alternative implementation, the encryption and access control may be performed by a security/privacy mediator deployed on the network.

14 Claims, 4 Drawing Sheets

SYSTEM AND METHOD FOR PRIVATE SOCIAL NETWORKING

CROSS-REFERENCE TO RELATED PATENT APPLICATIONS

The present application relies on and claims benefit of priority under 35 U.S.C. 119 from U.S. provisional patent application Ser. No. 61/367,304, filed on Jul. 23, 2010, which is incorporated by reference herein in its entirety.

BACKGROUND OF THE INVENTION

Field of the Invention

The present invention relates generally to providing secure Internet experience to users and, more specifically, to securing user's private data on social networking websites.

Description of the Related Art

Social networking websites, which focus on building and reflecting social relationships among people have gained tremendous popularity in the recent years. The use of such websites by a user typically involves creation of user's profile on the website. The profile would contain certain information about the user who owns the profile. Much of the aforesaid profile information is private in nature and consists of user's private data, such as age, background, educational information, interests, contact information, etc. Naturally, the security of this private information has become a primary concern to many users.

While most of the social networking websites provide built-in security and access control mechanisms, such conventional mechanisms are subject to certain known limitations. For example, due to the fact that the user's private information is stored in the social networking website servers, nothing prevents the social networking website from granting access to user's private data to other users, government entities and applications without the express knowledge and consent of the user.

Thus, novel systems and methods for keeping user's information private and providing the users with the ability to have full control as to who has the access to user's private data is needed.

SUMMARY OF THE INVENTION

The inventive methodology is directed to methods and systems that substantially obviate one or more of the above and other problems associated with conventional techniques for securing user's private data on social networking websites.

In accordance with one aspect of the inventive concept, there is provided a computerized system and associated method, the system incorporating a privacy mediator enabling a first user of a first user terminal to post at least a first content to a social networking website and enabling a second user of a second user terminal to retrieve at least the first posted content from the social networking website, the privacy mediator operable to secure at least a portion of the first content prior to posting on the social networking website and to render accessible the secured portion of the first content prior to furnishing to the second user terminal; and a web server communicatively coupled with the privacy mediator, the first user terminal and the second user terminal and operable to furnish the retrieved first content to the second user terminal. In the inventive system, the web server is further operable to receive the first content from the first user terminal and to transmit the first content to the privacy mediator for posting to the social networking website and the first content is posted to the social networking website in a secure form.

In accordance with another aspect of the inventive concept, there is provided a computerized system and associated method, the system incorporating a first user terminal comprising a first networking interface operable to establish a first connection with a social networking website and a first central processing unit executing a first instance of a filter application operable to receive from the first user at least a first content and to post the received at least first content to the social networking website, the first instance of the filter operable to secure at least a portion of the first content prior to posting to the social networking website; and a second user terminal comprising a second networking interface operable to establish a second connection with the social networking website and a second central processing unit executing a second instance of the filter enabling a second user of the second user terminal to retrieve the at least the first posted content from the social networking website, the second instance of the filter operable to render accessible the secured portion of the first content prior to furnishing to the second user.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
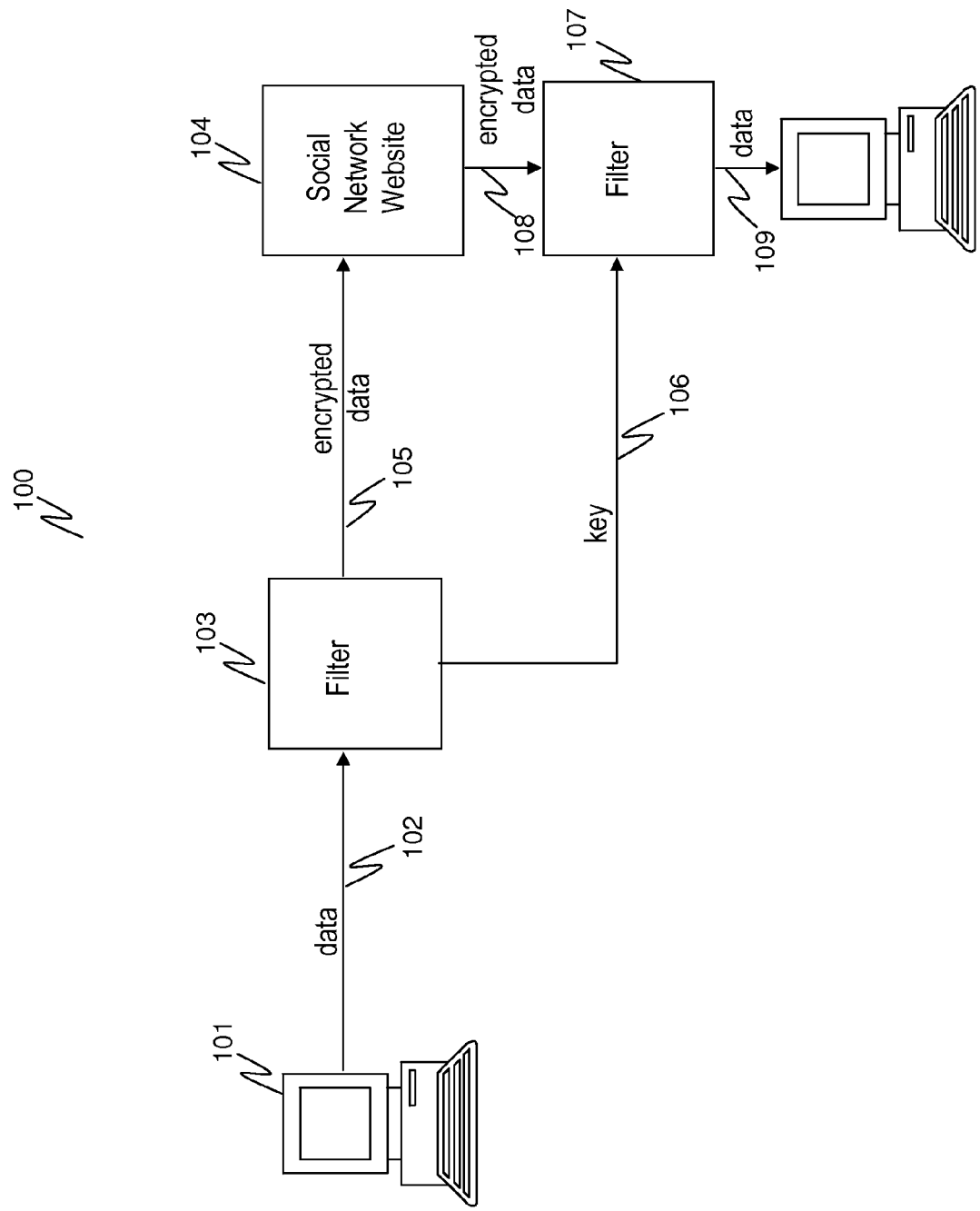
FIG. 1 illustrates an exemplary embodiment of the inventive system.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention.

The following detailed description is, therefore, not to be construed in a limited sense. Additionally, the various embodiments of the invention as described may be implemented in the form of a software running on a general purpose computer, in the form of a specialized hardware, or combination of software and hardware.

One aspect of the inventive technology is a privacy filter designed to protect user privacy and put users in control of their data on social networks. In one embodiment, the inventive technology is implemented as an application that is configured as a web browser plug-in for users to use when users access various social networks. When the user activates the inventive web browser plug-in, the plug-in sets up an inventive filter that protects user data on the network.

In one or more embodiments of the invention, users are enabled to configure a filter to set privacy settings for the specific data. The inventive filter would ensure that the user's privacy is protected and that third party applications don't gain unauthorized access to user's private information.

In one or more embodiments of the inventive concept, user's online data is divided between two data categories:

A. Data that users choose to share (for example pictures shared by users with friends on a social networking website, such as Facebook). In one or more embodiments of the invention, the user is provided with the ability to specify with whom the user desires to share the data. For example, the user may choose to only share the data with close friends or with a large circle of friends, but not with people the user does not know or the user may choose to make his or her pictures or information entirely public.

B. The second type of data is the data that is collected by the social networking service without the user's knowledge. For example, Google collects each user's search history without the user giving permission and certainly without the user volunteering such data. Similarly, third party applications on social networking websites scrape user profiles and sell or use user data without the user choosing to share such data.

Various embodiments of the inventive technology protect users from such applications that use user's data without express authorization from the user by creating the inventive data filter, which operates between the user and the social networks accessed by the user.

In one or more embodiments of the invention, the filter operates in the following way. First, the filter encrypts all information that is posted by the user on a social network using SSL encryption technology. With reference to FIG. 1, illustrating an embodiment of the invention 100, when the user using a client computer 101 inputs information 102 into the social network website accessed by the user's web browser, the inventive filter 103, which operates as a web browser plug-in intercepts the input information before it is actually transmitted by the browser to the social network website 104 and applies one of encryption technology algorithms to the intercepted information. After encryption, the input information 105 is furnished to the social network and is stored in its servers.

Thereafter, in one or more embodiments of the invention, the user is provided with the ability to specify the privacy settings for the user data in the inventive filter determining, who has the key to decrypt each portion of the encrypted content. In one or more embodiments of the invention, the user can designate specific individual friends by their respective profile names, user IDs or any similar criteria, within the social network to view the user data. In another implementation, the user can designate a group of individuals that could be determined based on a predefined criteria. For example, the user can designate all of the individuals that are labeled as his "friends" on the social network or that have another predetermined relationship to the user. As would be appreciated by those of skill in the art, the nature of the relationship between the user and the designated individuals is not critical to the method of operation of the present invention.

After the aforesaid privacy settings have been set, in one or more embodiments of the invention, the inventive filter is configured to automatically assign a virtual decryption key necessary to decrypt the user's private data to all the users to whom the permission to view the information was granted by the user using the inventive filter.

On the other hand, in one or more embodiments of the invention, to all the other parties, who do not possess the key necessary to decrypt user's information, the user's information will not be readable and will appear as a string of random characters.

The assigned virtual decryption key(s) 106 are transmitted to the designated individual users or groups of users using any known or later developed secure key transmission protocol. In one embodiment of the invention, the designated individual users or groups of users will be able to decrypt the data only if they also use the inventive filter, which may be also implemented as web browser plug-in. In this implementation, the key is transmitted by the inventive filter used by the user to the one or more inventive filters 107 operated by the designated users or groups of users. In this case, the designated users or groups of users use the received key 106 to decrypt encrypted data 108, which they receive from the social networking website 104. The decrypted data 109 can be read by the designated users.

In another embodiment of the invention, the virtual decryption key(s) assigned to the users are universal keys, which could be used by any suitable decryption software to decrypt the user's data.

Figure 2:
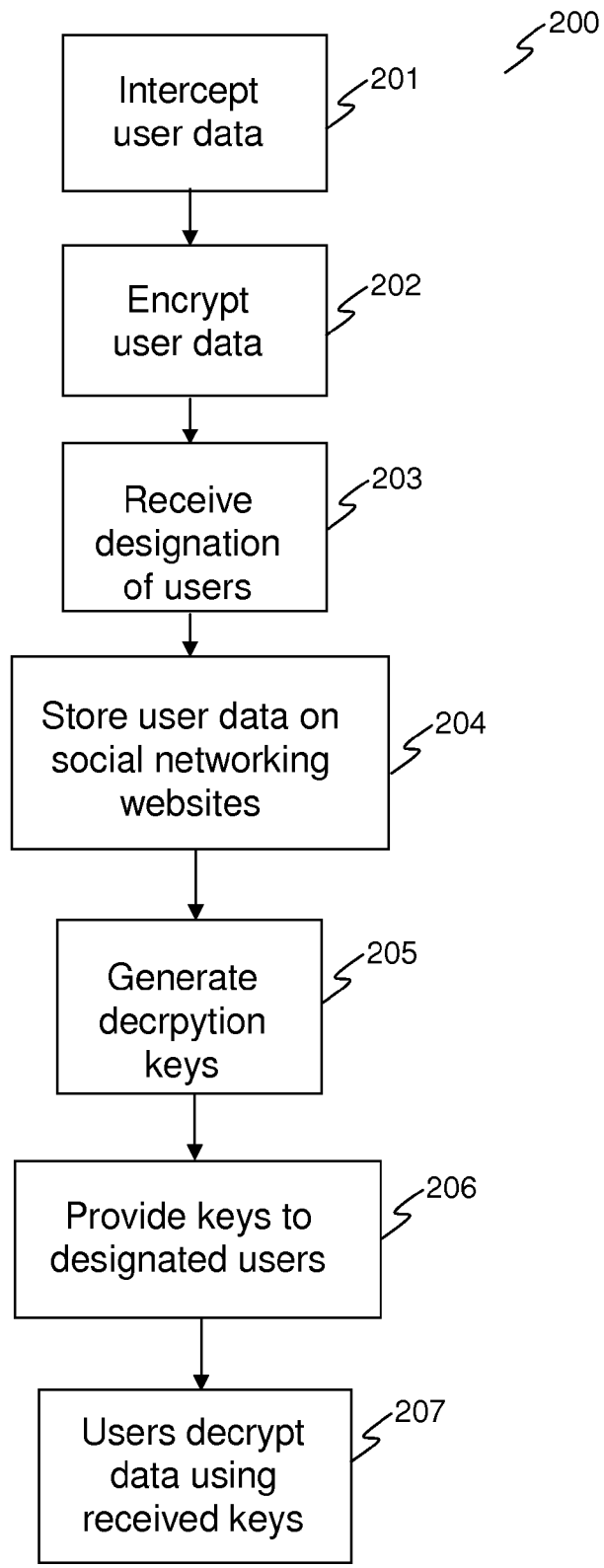
FIG. 2 illustrates an exemplary operating sequence of an exemplary embodiment of the inventive system.

FIG. 2 illustrates an exemplary operating sequence of an exemplary embodiment of the inventive system. Specifically, at step 201, the inventive filter, operating as a web browser plug-in installed on the user's terminal, intercepts the user data input by the user into the web browser window. At step 202, the inventive filter encrypts the intercepted data using an encryption key. At step 203, the inventive filter receives designation of the users and groups of users who are allowed to view the user data. At step 204, the user data is provided to and stored on the social networking website. At steps 205 and 206, decryption keys are generated and provided to the designated users and groups. Finally, at step 207, the users decrypt the data using the received decryption keys.

In one or more embodiments of the invention, the user may select different users and/or different groups of users to have access to different portions of user data, such as for interest data, for status data, and the like.

As would be appreciated by those of skill in the art, the inventive filter operated to enable the user to have a complete control over his or her information placed on the social networking website in that even the social networking website itself does not have access to the stored user data in a decrypted form. Thus, user's data on the social networking website cannot be used by any unauthorized users or applications, even if such use is permitted by the social networking website and user's privacy on the social networking website is maintained.

Figure 3:
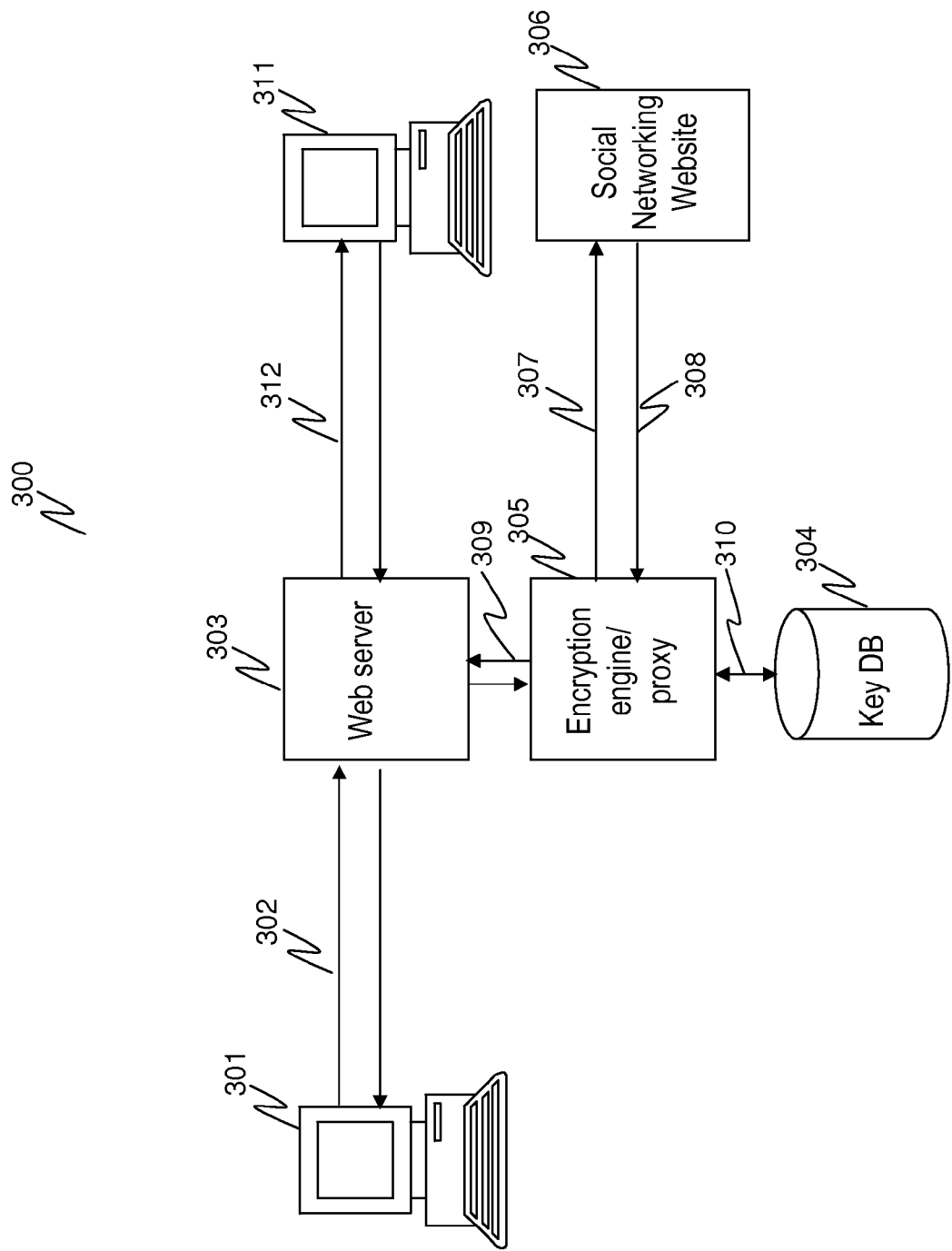
FIG. 3 illustrates another exemplary embodiment of the inventive system.

In yet another embodiment of the invention, the user is provided with an access to social networking website through a security and/or privacy mediator. In one implementation 300, the security/privacy mediator comprises an encryption/decryption engine, accessed through an associated web server and positioned between the user and the social networking website, as shown in FIG. 3. As shown in this figure, the security/privacy mediator incorporates an encryption engine/proxy 305 coupled with a web server 303. The web server is configured to enable web access to the functionality of the encryption engine/proxy 305, while the encryption engine/proxy 305 is configured to access or send content specified by the user and to perform encryption/decryption operation with respect to the accessed/sent content.

As in the above-described embodiment of the inventive system using the inventive filter, the inventive security and/or privacy mediator enables the user to seamlessly and selectively encrypt the content to be posted to social networking websites. The user can also use the security and/or privacy mediator to grant access to the encrypted content to selected individual users, groups of users or even applications. Thus, the security and/or privacy mediator in this embodiment operates similar to the filter described above. However, the inventive security and/or privacy mediator is deployed on the network, while the inventive filter is deployed on the user's client terminal.

In one or more embodiments of the invention, the social networking website is accessed through the security/privacy mediator 303/305 by re-writing the URL of the social networking website in such a way as to have the user redirected to the social networking website through the security/privacy mediator 303/305. In one embodiment, the re-written URL maybe in the form: "www.securitymediator.com/?url=socialnetworkingwebsite.com_index.html." In one or more embodiments, a corresponding browser bookmark is created, the browser bookmark being associated with the re-written URL, to enable one-click assess of the social networking website through the security/privacy mediator 303/305 by the user.

In one or more embodiments of the invention, the inventive system stores the encryption keys in the key database 304 accessed by the security/privacy mediator 303/305. In another embodiment, the user specifies the key at the beginning of the work session with the security/privacy mediator.

In one or more embodiments of the invention, the security/privacy mediator 303/305 encrypts certain information the user sends to the social networking website 306. For instance, the inventive security/privacy mediator 303/305 may be configured to encrypt only certain information that the user posts to his or her profile with the social networking website. In one implementation, the user may decide to encrypt his educational information or his interests, while keeping the remaining information public. The information that the user designates for encryption would be encrypted with a key, making said information private. In order to enable another user (recipient) to decrypt the information, the user needs to provide the recipient with the decryption key, which may be the same (symmetric key) or different (asymmetric key) from the encryption key. Once the recipient is in possession of the decryption key, he or she can access and decrypt the information using the same security/privacy mediator 303/305. To this end, the recipient may be provided with a URL for the user's profile re-written to redirect the recipient to the social networking website using the inventive security/privacy mediator 303/305.

In one or more embodiments of the invention, the user can configure the security/privacy mediator 303/305 to specify which content of the user's profile to encrypt and which is not to encrypt. Specifically, user may be enabled to specify which fields of user's profile with the social networking site the security/privacy mediator 503/505 should encrypt. In one embodiment of the invention, the user's educational history and interests information are encrypted. The remaining data fields of the user's profile are not encrypted. The information regarding the fields to be encrypted may be stored in the user preferences section of the user's account or area with the security/privacy mediator 303/305. In one embodiment of the invention, the security/privacy mediator 303/305 is configured to authenticate the user before performing encryption/decryption operations on behalf of the user in order to have access to user's preferences and authorizations.

After the user's profile with the social networking website has been created using the inventive security/privacy mediator 303/305, the user can use the inventive security/privacy mediator 303/305 to configure the access rules for the created profile. In particular, the user may specify which other users, groups of users or applications should be allowed to have access to the user's private information in the user's profile with the social networking website. The inventive security/privacy mediator 303/305 would enforce these access rules specified by the user by means of authenticating and/or verifying credentials of other users who wish to access the user's profile on the social networking website.

In one embodiment of the invention, other users would access the private information of the user using the same inventive security/privacy mediator 303/305 and user terminal 311 by means of a request/response 312, which involves the authentication of the accessing user with the inventive security/privacy mediator 303/305.

In one exemplary scenario, two users can use the inventive security/privacy mediator 303/305 to communicate through a social networking website in a secure manner. The user would first configure the security/privacy mediator 303/305 to encrypt certain data fields of an html form posted on the social networking website. The user would then use the security/privacy mediator 303/305 to access the social networking website and input the message to a recipient using the aforesaid html form. The security/privacy mediator 303/305 would automatically encrypt user's input based on the specified encryption configuration and post the encrypted information to the social networking site. The security/privacy mediator 303/305 would leave the remaining fields unchanged.

Thereafter, the user would either provide the decryption key to the recipient or identify the recipient to the security/privacy mediator 303/305. In the first instance, the recipient would input the received decryption key into the security/privacy mediator 303/305 and use it to access the message from the user, whereupon the security/privacy mediator 303/305 would decrypt the message using the provided decryption key, enabling the recipient to view the message. In the second scenario, the security/privacy mediator 303/305 would automatically decrypt the message with the appropriate key, upon verifying that the recipient is the person identified by the user to the security/privacy mediator 303/305 as the intended recipient of the message.

On the other hand, any other user, who does not possess the security key or who was not designated by the user, as confirmed through authentication, as the recipient of the message would not be able to read the message. Likewise, only authorized users would be able to view encrypted fields of the user's profile on the social networking website. The authorization of the user to access the private information is determined based on user's authentication with the security/privacy mediator 303/305. The above exemplary method could be applied for private communication through a variety of web-enabled systems including web-enabled email services, social networking websites, billboards, web blogs, and any similar communication means with web access.

In one or more embodiments of the inventive concept, the social networking website could offer a choice of accessing its content through the security/privacy mediator 303/305 or in a conventional way (after login, or just implicitly consenting to collection of behavior info). If the user opts for private and/or secure access, additional or different advertisements could be displayed to the user, however the user would receive privacy protection from a trusted independent third party. Advantages of such protection may include hidden IP address, possibly different cookies/short-term cookies etc. In one or more embodiments of the invention, the social networking website may post a link on its website redirecting the user to content through the security/privacy mediator 303/305. The link may me associated with the URL modified as specified above.

In one or more embodiments of the invention, the inventive system enables the user to submit the content to be posted online using, for example, social networking website, blog, and the like web tools, in such a way that the posted content includes one or more private portions not accessible to other users without the inventive security/privacy mediator 303/305. These private portions of the content are associated with privacy/security settings specified by the user and enforced by the inventive security/privacy mediator 303/305.

In one or more embodiments of the inventive system, the exemplary private portions of the content include encrypted information, which is included into the user's profile. In this embodiment, the security/privacy mediator 303/305 enables the designated users or groups of users to gain access to the private content by providing decryption of the private content. If the private portions of the content are accessed without the security/privacy mediator 303/305, said portions are not readable.

In one or more embodiments of the inventive system, the exemplary private portions of the content include a reference to the actual content, which is located elsewhere on the network. In this embodiment, the security/privacy mediator 303/305 retrieves and displays the private content using the reference information. If the private portions of the content are accessed without the security/privacy mediator 303/305, said referenced content is not supplied.

In one or more embodiments of the inventive system, the exemplary private portions of the content include an intentionally misdirected/obfuscated content. For example, in this embodiment, a fake user email address or phone number may be displayed when the content is viewed without the inventive security/privacy mediator 303/305. On the other hand, when the private content is viewed using the inventive security/privacy mediator 303/305, it retrieves and displays the correct user email address or phone number.

In one or more embodiments of the invention, to view the protected content, the user must login into the security/privacy mediator site, while the login information may only be distributed to selected users to enforce the access policy specified by the user. For instance, to gain access to the private content (e.g. user's email address), the viewing user must belong to an established group, verified by the security/privacy mediator 303/305. An example of such group may be a group of user's "friends" on the social networking website.

In another embodiment, the system may be configured to allow the protected content to be seen by anybody, but not by the owner of the social networking website. For instance, all human users of the social networking site will be given the access to private information using the security/privacy mediator 303/305, while applications operating in conjunction with the social networking site as well as marketers will be denied such access. In this embodiment, the security/privacy mediator 303/305 may not require any login from the user or may not perform the user verification.

In another embodiment, the inventive system is monetized using advertisements that are inserted into the target content displayed to the user, as described, for example in U.S. patent publication No. 2009/0276314 A1, incorporated by reference herein in its entirety.

Figure 4:
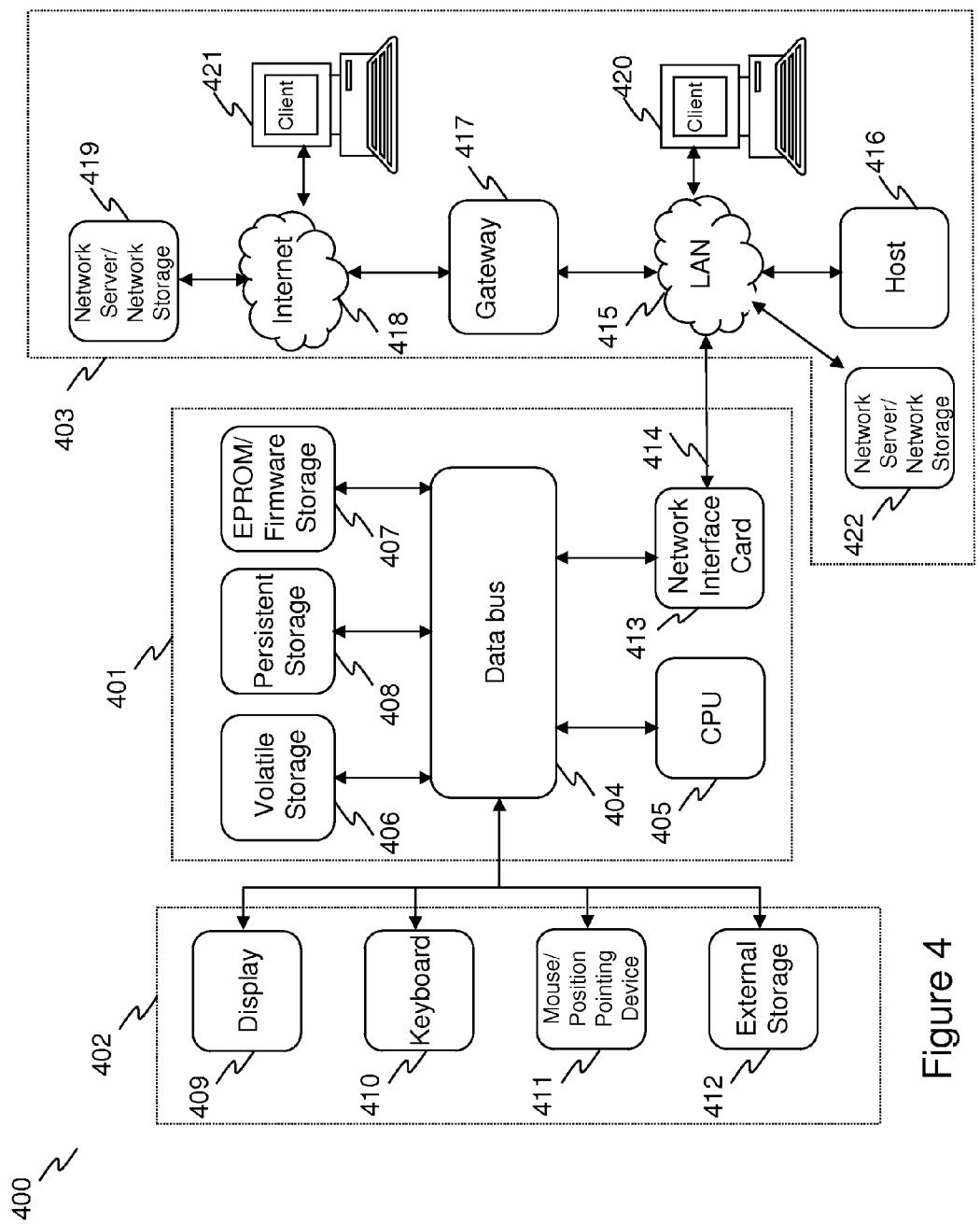
FIG. 4 illustrates an exemplary embodiment of a computer platform upon which the inventive system may be implemented.

FIG. 4 illustrates an exemplary embodiment of a computer platform upon which the inventive system may be implemented.

FIG. 4 is a block diagram that illustrates an embodiment of a computer/server system 400 upon which an embodiment of the inventive methodology may be implemented. The system 400 includes a computer/server platform 401, peripheral devices 402 and network resources 403.

The computer platform 401 may include a data bus 405 or other communication mechanism for communicating information across and among various parts of the computer platform 401, and a processor 405 coupled with bus 401 for processing information and performing other computational and control tasks. Computer platform 401 also includes a volatile storage 406, such as a random access memory (RAM) or other dynamic storage device, coupled to bus 405 for storing various information as well as instructions to be executed by processor 405. The volatile storage 406 also may be used for storing temporary variables or other intermediate information during execution of instructions by processor 405. Computer platform 401 may further include a read only memory (ROM or EPROM) 407 or other static storage device coupled to bus 405 for storing static information and instructions for processor 405, such as basic input-output system (BIOS), as well as various system configuration parameters. A persistent storage device 408, such as a magnetic disk, optical disk, or solid-state flash memory device is provided and coupled to bus 401 for storing information and instructions.

Computer platform 401 may be coupled via bus 405 to a display 409, such as a cathode ray tube (CRT), plasma display, or a liquid crystal display (LCD), for displaying information to a system administrator or user of the computer platform 401. An input device 410, including alphanumeric and other keys, is coupled to bus 401 for communicating information and command selections to processor 405. Another type of user input device is cursor control device 411, such as a mouse, a trackball, or cursor direction keys for communicating direction information and command selections to processor 405 and for controlling cursor movement on display 409. This input device typically has two degrees of freedom in two axes, a first axis (e.g., x) and a second axis (e.g., y), that allows the device to specify positions in a plane.

An external storage device 412 may be coupled to the computer platform 401 via bus 405 to provide an extra or removable storage capacity for the computer platform 401. In an embodiment of the computer system 400, the external removable storage device 412 may be used to facilitate exchange of data with other computer systems.

The invention is related to the use of computer system 400 for implementing the techniques described herein. In an embodiment, the inventive system may reside on a machine such as computer platform 401. According to one embodiment of the invention, the techniques described herein are performed by computer system 400 in response to processor 405 executing one or more sequences of one or more instructions contained in the volatile memory 406. Such instructions may be read into volatile memory 406 from another computer-readable medium, such as persistent storage device 408. Execution of the sequences of instructions contained in the volatile memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 408. Volatile media includes dynamic memory, such as volatile storage 406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 405 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 405. The bus 405 carries the data to the volatile storage 406, from which processor 405 retrieves and executes the instructions. The instructions received by the volatile memory 406 may optionally be stored on persistent storage device 408 either before or after execution by processor 405. The instructions may also be downloaded into the computer platform 401 via Internet using a variety of network data communication protocols well known in the art.

The computer platform 401 also includes a communication interface, such as network interface card 413 coupled to the data bus 405. Communication interface 413 provides a two-way data communication coupling to a network link 415 that is coupled to a local network 415. For example, communication interface 413 may be an integrated services digital network (ISDN) card or a modem to provide a data communication connection to a corresponding type of telephone line. As another example, communication interface 413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 413 sends and receives electrical, electromagnetic or optical signals that carry digital data streams representing various types of information.

Network link 413 typically provides data communication through one or more networks to other network resources. For example, network link 415 may provide a connection through local network 415 to a host computer 416, or a network storage/server 417. Additionally or alternatively, the network link 413 may connect through gateway/firewall 417 to the wide-area or global network 418, such as an Internet. Thus, the computer platform 401 can access network resources located anywhere on the Internet 418, such as a remote network storage/server 419. On the other hand, the computer platform 401 may also be accessed by clients located anywhere on the local area network 415 and/or the Internet 418. The network clients 420 and 421 may themselves be implemented based on the computer platform similar to the platform 401.

Local network 415 and the Internet 418 both use electrical, electromagnetic or optical signals that carry digital data streams. The signals through the various networks and the signals on network link 415 and through communication interface 413, which carry the digital data to and from computer platform 401, are exemplary forms of carrier waves transporting the information.

Computer platform 401 can send messages and receive data, including program code, through the variety of network(s) including Internet 418 and LAN 415, network link 415 and communication interface 413. In the Internet example, when the system 401 acts as a network server, it might transmit a requested code or data for an application program running on client(s) 420 and/or 421 through Internet 418, gateway/firewall 417, local area network 415 and communication interface 413. Similarly, it may receive code from other network resources.

The received code may be executed by processor 405 as it is received, and/or stored in persistent or volatile storage devices 408 and 406, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the inventive system and method for securing user's data on social networking websites. It is intended that the specification and examples be considered as exemplary only, with a true scope and spirit of the invention being indicated by the following claims.

What is claimed is:

1. A computerized system comprising a server comprising a processor and a memory, the computerized system further comprising:
   a. a privacy mediator enabling a first user of a first user terminal to post at least a first content to a social networking web site and enabling a second user of a second user terminal to retrieve at least the first posted content from the social networking website, the privacy mediator secures at least a portion of the first content prior to posting on the social networking website and to render accessible the secured portion of the first content prior to furnishing to the second user terminal, wherein the privacy mediator directly communicates with the social networking website and posts the first content comprising the secured portion directly to the social networking website and wherein the privacy mediator secures the at least a portion of the first content by encrypting the at least a portion of the first content and render accessible the secured portion of the first content by decrypting the encrypted at least a portion of the first content; and
   b. a web server communicatively coupled with the privacy mediator, the first user terminal and the second user terminal and furnishing the retrieved first content to the second user terminal, wherein the web server is further receiving the first content from the first user terminal and to transmit the first content to the privacy mediator for posting to the social networking website, wherein the first content comprises personal information of the first user, the personal information of the first user being secured by the privacy mediator before reaching the social networking website, wherein the personal information of the first user is directly posted to the social networking website and stored therein in a secure encrypted form and wherein the access to the unencrypted first content posted to the social networking website is controlled independently and outside of the social networking website and an operator of the social networking website and any user of the social networking website other than the first user and the second user have access to the secured encrypted first content but do not have access to the unencrypted first content posted to the social networking website,
   wherein the privacy mediator encrypts the at least a portion of the first content using an encryption key and wherein the encryption key is provided to the second user; and
   wherein the privacy mediator receives from the first user terminal designation of the portion of the first content for encryption, wherein the designated portion of the first content comprises at least a portion of the personal information of the first user.

2. The system of claim 1, wherein the remaining portion of the first content not designated for encryption is not encrypted.

3. The system of claim 1, wherein the web server is further operable to receive from the first user terminal a designation of the second user and to enable the designated second user to view the first content.

4. The system of claim 1, wherein the first content further comprises data collected by the social networking website without knowledge of the first user, the data collected by the social networking website without knowledge of the first user being secured before reaching the social networking website.

5. The system of claim 1, wherein the privacy mediator is operable to secure the at least a portion of the first content by substituting the at least a portion of the first content with a reference and render accessible the secured portion of the first content by providing the at least a portion of the first content based on the reference.

6. The system of claim 1, wherein the privacy mediator is operable to secure the at least a portion of the first content by substituting the at least a portion of the first content with an obfuscated content and render accessible the secured portion of the first content by providing the at least a portion of the first content based on the obfuscated content.

7. The system of claim 1, wherein the privacy mediator is operable to automatically determine identity of the second user based on a predetermined criterion specified by the first user.

8. A computerized system comprising:
   a. a first user terminal comprising a first networking interface establishing a first connection with a social networking website and a first central processing unit executing a first instance of a filter application that receives from the first user at least a first content and to post the received at least first content to the social networking website, the first instance of the filter application secures at least a portion of the first content prior to posting to the social networking website, wherein the first instance of the filter application directly communicates with the social networking website and posts the first content comprising the secured portion directly to the social networking web site, wherein the first instance of the filter application securing the at least a portion of the first content by encrypting the at least a portion of the first content and wherein the second instance of the filter application is rendering accessible the secured portion of the first content by decrypting the encrypted at least a portion of the first content; and
   b. a second user terminal comprising a second networking interface establishing a second connection with the social networking website and a second central processing unit executing a second instance of the filter application enabling a second user of the second user terminal to retrieve the at least the first posted content from the social networking website, the second instance of the filter application rendering accessible the secured portion of the first content prior to furnishing to the second user, wherein the first content comprises personal information of the first user, the personal information of the first user being secured by the first instance of the filter application before reaching the social networking website, wherein the personal information of the first user is directly posted to the social networking website and stored therein in a secure encrypted form and wherein the access to the unencrypted first content posted to the social networking website is controlled independently and outside of the social networking website and the operator of the social networking website and any user of the social networking web site other than the first user and the second user have access to the secured encrypted first content but do not have access to the unencrypted first content posted to the social networking website,
   wherein the first instance of the filter application encrypts the at least a portion of the first content using an encryption key and wherein the encryption key is provided to the second instance of the filter application based on authentication of the second user by the second instance; and wherein the first instance of the filter application receives from the first user designation of the portion of the first content for encryption, wherein the designated portion of the first content comprises at least a portion of the personal information of the first user.

9. The system of claim 8, wherein the remaining portion of the first content not designated for encryption is not encrypted.

10. The system of claim 8, wherein the first instance of the filter application is further operable to receive from the first user a designation of the second user and to enable the designated second user to view the first content.

11. The system of claim 8, wherein the first instance of the filter application is operable to authenticate the first user and the second instance of the filter application is operable to authenticate the second user and verify access rights of the second user to the at least first content based on access rules received from the first user.

12. The system of claim 8, wherein the first instance of the filter application is operable to secure the at least a portion of the first content by substituting the at least a portion of the first content with a reference and wherein the second instance of the filter application is operable to render accessible the secured portion of the first content by providing the at least a portion of the first content based on the reference.

13. The system of claim 8, wherein the first instance of the filter application is operable to secure the at least a portion of the first content by substituting the at least a portion of the first content with an obfuscated content and wherein the second instance of the filter application is operable to render accessible the secured portion of the first content by providing the at least a portion of the first content based on the obfuscated content.

14. The system of claim 8, wherein the first content further comprises data collected by the social networking website without knowledge of the first user, the data collected by the social networking website without knowledge of the first user being secured before reaching the social networking website.

* * * * *